(12) United States Patent
Odell

(10) Patent No.: US 6,496,392 B2
(45) Date of Patent: Dec. 17, 2002

(54) DISSIPATIVE CLAMPING OF AN ELECTRICAL CIRCUIT WITH A CLAMP VOLTAGE VARIED IN RESPONSE TO AN INPUT VOLTAGE

(75) Inventor: Arthur B. Odell, Cupertino, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 09/835,008

(22) Filed: Apr. 13, 2001

(65) Prior Publication Data

US 2002/0163821 A1 Nov. 7, 2002

(51) Int. Cl.[7] .............................................. H02M 7/122
(52) U.S. Cl. .................................. 363/56.11; 363/56.12
(58) Field of Search ......................... 363/21.04, 56.09, 363/56.11, 56.12

(56) References Cited

U.S. PATENT DOCUMENTS

| | | | | | |
|---|---|---|---|---|---|
| 4,016,482 A | * | 4/1977 | Cielo et al. | ............... | 363/56.12 |
| 4,870,554 A | * | 9/1989 | Smith | ...................... | 363/56.12 |
| 5,008,796 A | * | 4/1991 | Johnson | ................... | 363/56.11 |
| 5,278,748 A | * | 1/1994 | Kitajima | .................. | 363/56.12 |
| 5,621,623 A | * | 4/1997 | Kuriyama et al. | ....... | 363/56.11 |
| 5,703,763 A | * | 12/1997 | Smeets | ..................... | 363/56.11 |
| 5,805,434 A | * | 9/1998 | Vinciarelli et al. | ...... | 363/56.11 |
| 6,088,247 A | * | 7/2000 | Cheng | ..................... | 363/56.11 |
| 6,314,002 B1 | * | 11/2001 | Qian et al. | ............... | 363/21.04 |
| 6,317,341 B1 | * | 11/2001 | Fraidlen et al. | .......... | 363/56.09 |
| 6,320,765 B2 | * | 11/2001 | Yasumura | ................ | 363/56.12 |

* cited by examiner

*Primary Examiner*—Jeffrey Sterrett
(74) *Attorney, Agent, or Firm*—Blakely Sokoloff Taylor & Zafman LLP

(57) ABSTRACT

Dissipative clamping apparatuses and methods for electrical circuits. In one aspect of the invention, In one aspect of the invention, a method includes switching a power supply input on an energy transfer element, regulating a power supply output by switching the power supply input on the energy transfer element, clamping a voltage on the energy transfer element to a clamp voltage and varying the clamp voltage in response to the power supply input. In another aspect, an electrical circuit includes a dissipative clamp circuit coupled to an input of the electrical circuit. An inductive element is coupled between the dissipative clamp circuit and an output of the electrical circuit. A switch is coupled in series with the inductive element. The dissipative clamp circuit is coupled to provide a clamp voltage across the inductive element, the clamp voltage is provided by the dissipative clamp circuit responsive to conditions at the input of the electrical circuit, the dissipative clamp circuit is coupled to maintain a voltage across the switch below a switch voltage limit.

22 Claims, 7 Drawing Sheets

DISSIPATIVE CLAMPING OF AN ELECTRICAL CIRCUIT WITH A CLAMP VOLTAGE VARIED IN RESPONSE TO AN INPUT VOLTAGE

BACKGROUND OF THE INVENTION

1. Field of the Invention

The present invention relates generally to electrical circuits and, more specifically, the present invention relates to electrical circuit clamping.

2. Background Information

Electronic devices use power to operate. Switched mode power supplies are commonly used due to their high efficiency and good output regulation to power many of today's electronic devices. In a known switched mode power supply, a low frequency (e.g. 50 or 60 Hz mains frequency), high voltage alternating current (AC) is converted to high frequency (e.g. 30 to 300 kHz) AC, using a switched mode power supply control circuit. This high frequency, high voltage AC is applied to a transformer to transform the voltage, usually to a lower voltage, and to provide safety isolation. The output of the transformer is rectified to provide a regulated direct current (DC) output, which may be used to power an electronic device. The switched mode power supply control circuit usually provides output regulation by sensing the output and controlling it in a closed loop.

To illustrate, FIG. 1 is a schematic of a known forward power converter 101. A switch Q1 103 turns on and off in response to a control 105 to provide a regulated DC output voltage $V_{OUT}$ 129 from an unregulated DC input voltage $V_{IN}$ 127. In one embodiment, control 105 and switch Q1 103 are included in a switching regulator, which may be used to regulate the output voltage $V_{OUT}$ 129. This topology is well known and its operation is well documented.

Every forward converter must have a way to set the voltage on the primary winding 107 of the transformer 109 during the time when the switch Q1 103 is off. A popular way to set the voltage is with a clamp network 111 connected across the primary winding 107. The known clamp network 111 illustrated in FIG. 1 includes a resistor 113, a capacitor 115 and a diode 117 and absorbs and dissipates parasitic energy from the transformer 109 that is not delivered to the load 119 nor returned to the input 121. The balance of energy into the clamp network 111 through diode 117 and energy dissipated in 113 determines a clamp voltage $V_{CLAMP}$ 123 that is necessary prevent saturation of the transformer 109.

FIG. 2 shows with idealized waveforms how the voltage $V_{SWITCH}$ 125 on switch Q1 103 is related to the input voltage $V_{IN}$ 127 and the clamp voltage $V_{CLAMP}$ 123. The clamp voltage $V_{CLAMP}$ 123 must be high enough to prevent saturation of the transformer 109, but low enough to keep the voltage $V_{SWITCH}$ 125 below the breakdown voltage of switch Q1 1103.

FIG. 3 shows the relationship between $V_{CLAMP}$ 123 and $V_{IN}$ 127 in a known power supply. As the input voltage $V_{IN}$ 127 changes, the clamp voltage $V_{CLAMP}$ 123 must be confined between the two boundaries shown in FIG. 3. The maximum voltage boundary is a straight line determined by the breakdown voltage of switch Q1 103. The minimum voltage boundary is a curved line determined by the voltage necessary to keep the transformer 109 from saturation.

FIG. 3 shows how the clamp voltage $V_{CLAMP}$ 123 behaves with an RCD network, such as that illustrated in clamp network 111 of FIG. 1. When the power converter 101 operates in continuous conduction mode, the clamp voltage $V_{CLAMP}$ 123 stays substantially constant in response to changes in $V_{In}$ 127 at given load. The presence of leakage inductance in the transformer 109 causes the clamp voltage $V_{CLAMP}$ 123 to change with load 119. It is higher for greater current and lower for less current. The result is a restricted range of permissible input voltage $V_{IN}$ 127 that is shown in the shaded region of FIG. 3.

SUMMARY OF THE INVENTION

Dissipative clamping methods and apparatuses are disclosed. In one aspect of the invention, a method includes switching a power supply input on an energy transfer element, regulating a power supply output by switching the power supply input on the energy transfer element, clamping a voltage on the energy transfer element to a clamp voltage and varying the clamp voltage in response to the power supply input. Additional features and benefits of the present invention will become apparent from the detailed description, figures and claims set forth below.

BRIEF DESCRIPTION OF THE DRAWINGS

The present invention detailed illustrated by way of example and not limitation in the accompanying figures.

DETAILED DESCRIPTION

Embodiments of methods and apparatuses for dissipatively clamping an electrical circuit such as a power supply regulator are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Figure 4:
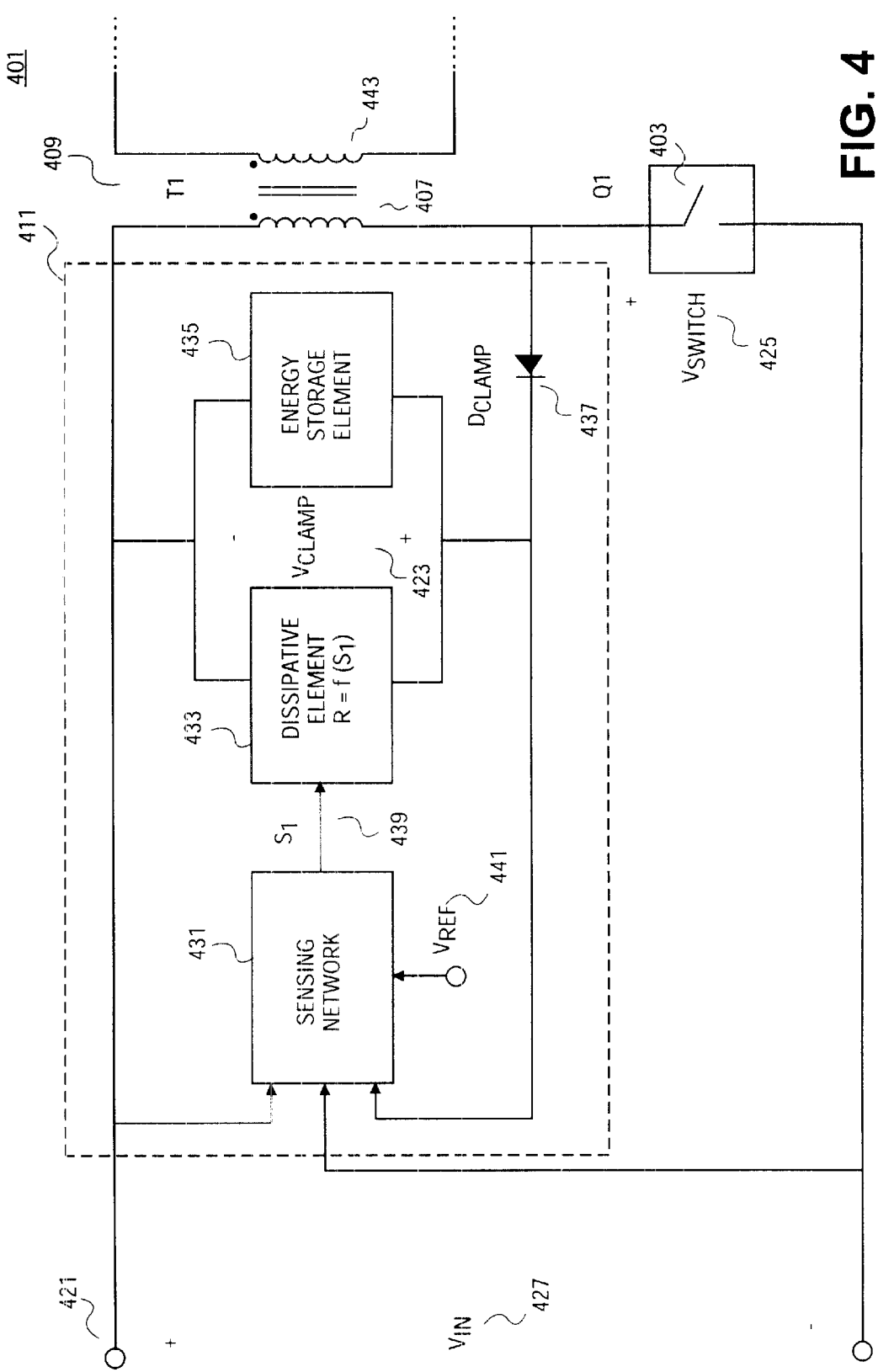
FIG. 4 is a block diagram illustrating one embodiment of the general elements of a dissipative clamp network in accordance with the teachings of the present invention.

As an overview, FIG. 4 shows the general elements of one embodiment of a dissipative clamp network 411 in an electrical circuit, such as for example a power supply 401, in accordance with the teachings of the present invention. As shown, an input voltage $V_{IN}$ 427 is received at an input 421. A clamp network 411 is used to clamp the voltage $V_{CLAMP}$ 423 across the primary winding 407 of a transformer 409. A switch 403 is coupled to primary winding 407 to drive primary winding 407 in response to a control circuit (not shown). It is appreciated that transformer 409 is an inductive element and may be referred to as an energy transfer element or the like. A clamp diode $D_{CLAMP}$ 437 provides a unidirectional path for the energy from the primary winding 407 of the transformer 409 to enter the clamp network 411. The energy is held by an energy storage element 435 and is lost through a dissipative element 433. In one embodiment, the dissipative element 433 is programmed by a signal $S_1$ 439 from a sensing network 431. The sensing network 431 produces the programming signal $S_1$ 439 from measurements of the input voltage $V_{IN}$ 427, the voltage on the energy storage element 435 and a reference voltage $V_{REF}$ 441 received by the sensing network 431. Thus, in one embodiment, energy stored in the leakage inductance of transformer 409 is dissipated in response to the input voltage $V_{IN}$ 427.

Figure 1:
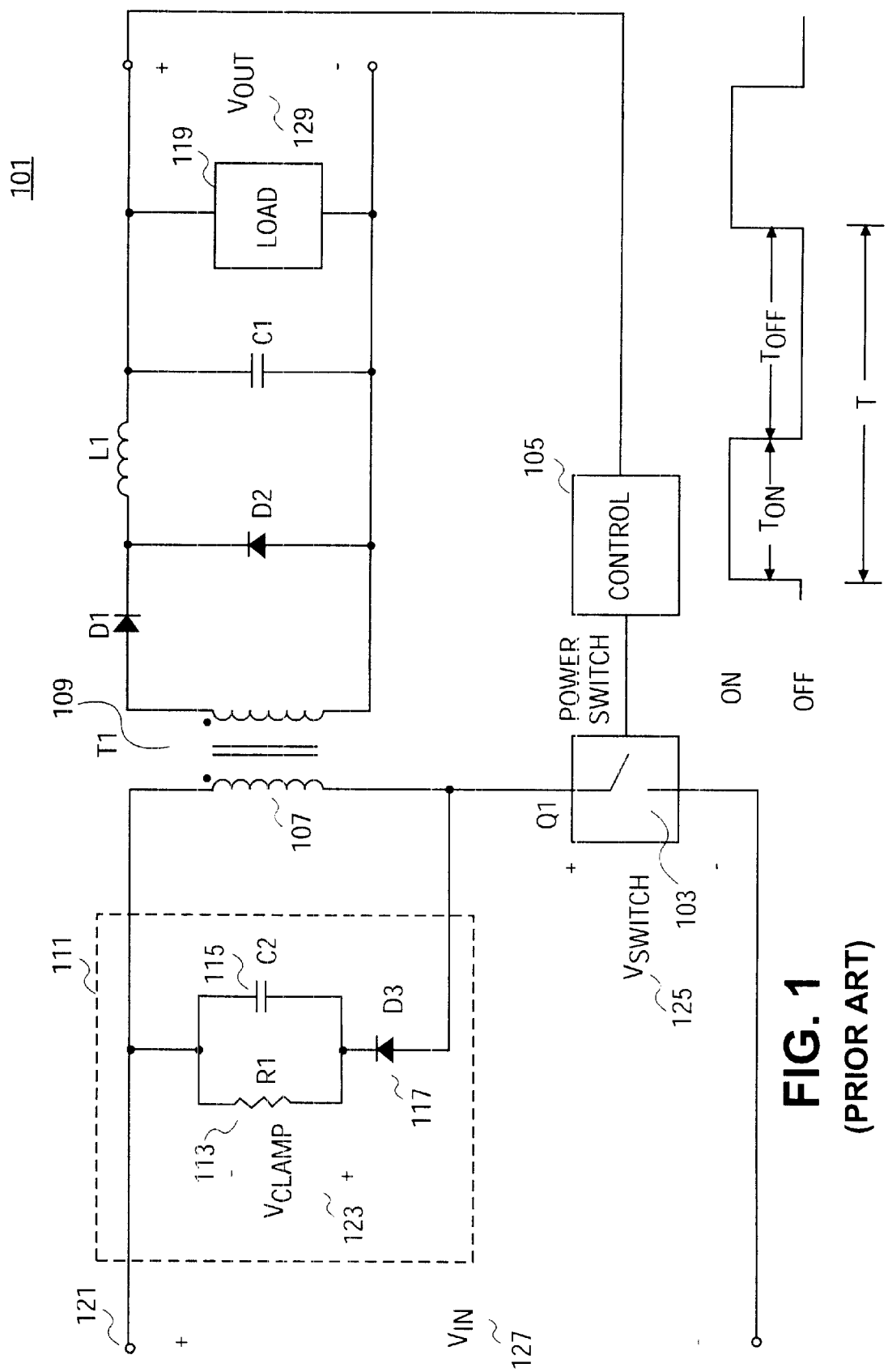
FIG. 1 is a schematic diagram illustrating a known forward converter power supply.
Figure 2:
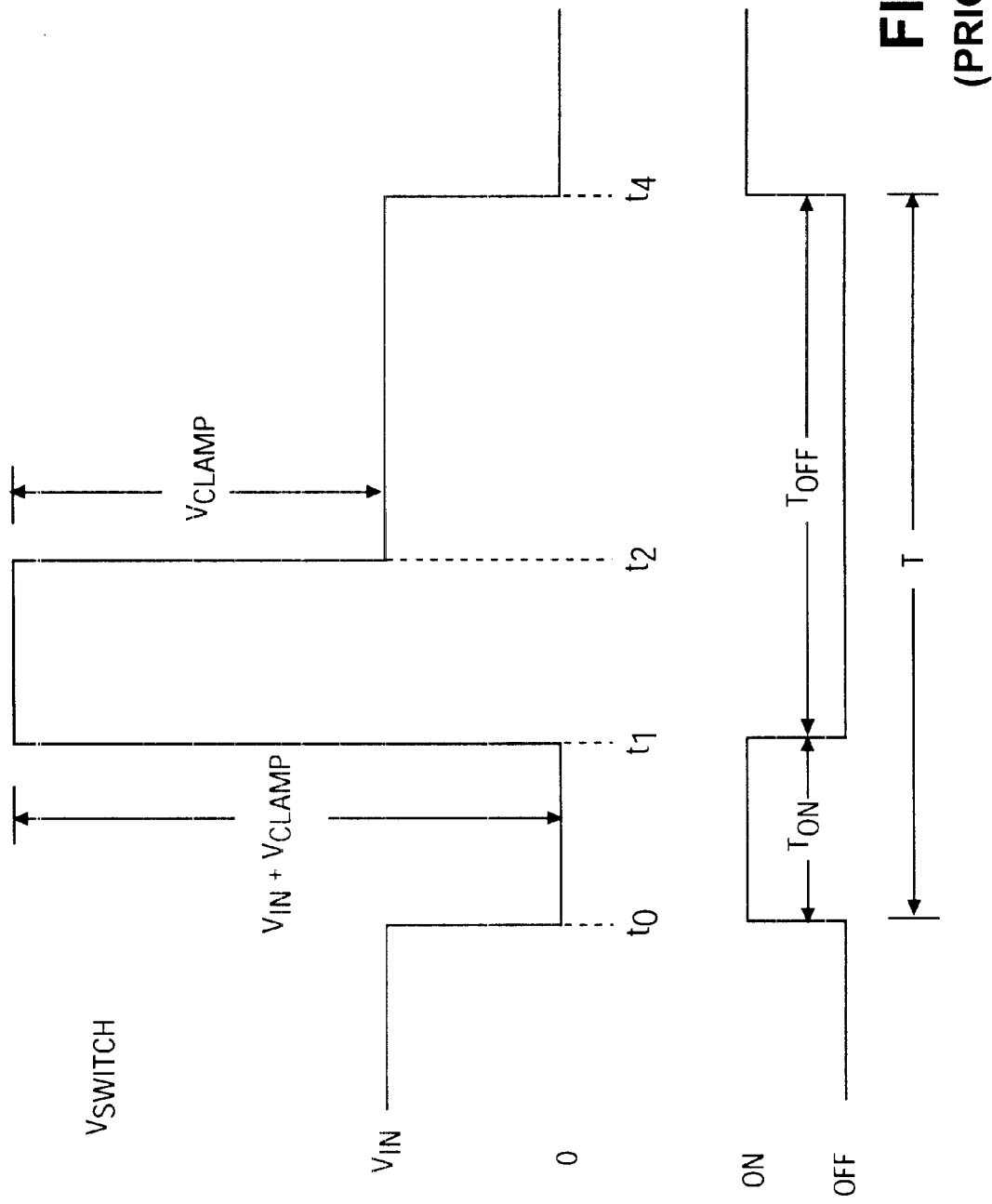
FIG. 2 is a timing diagram illustrating how the voltage on the switch is related to the input voltage and the clamp voltage in a known power supply.
Figure 3:
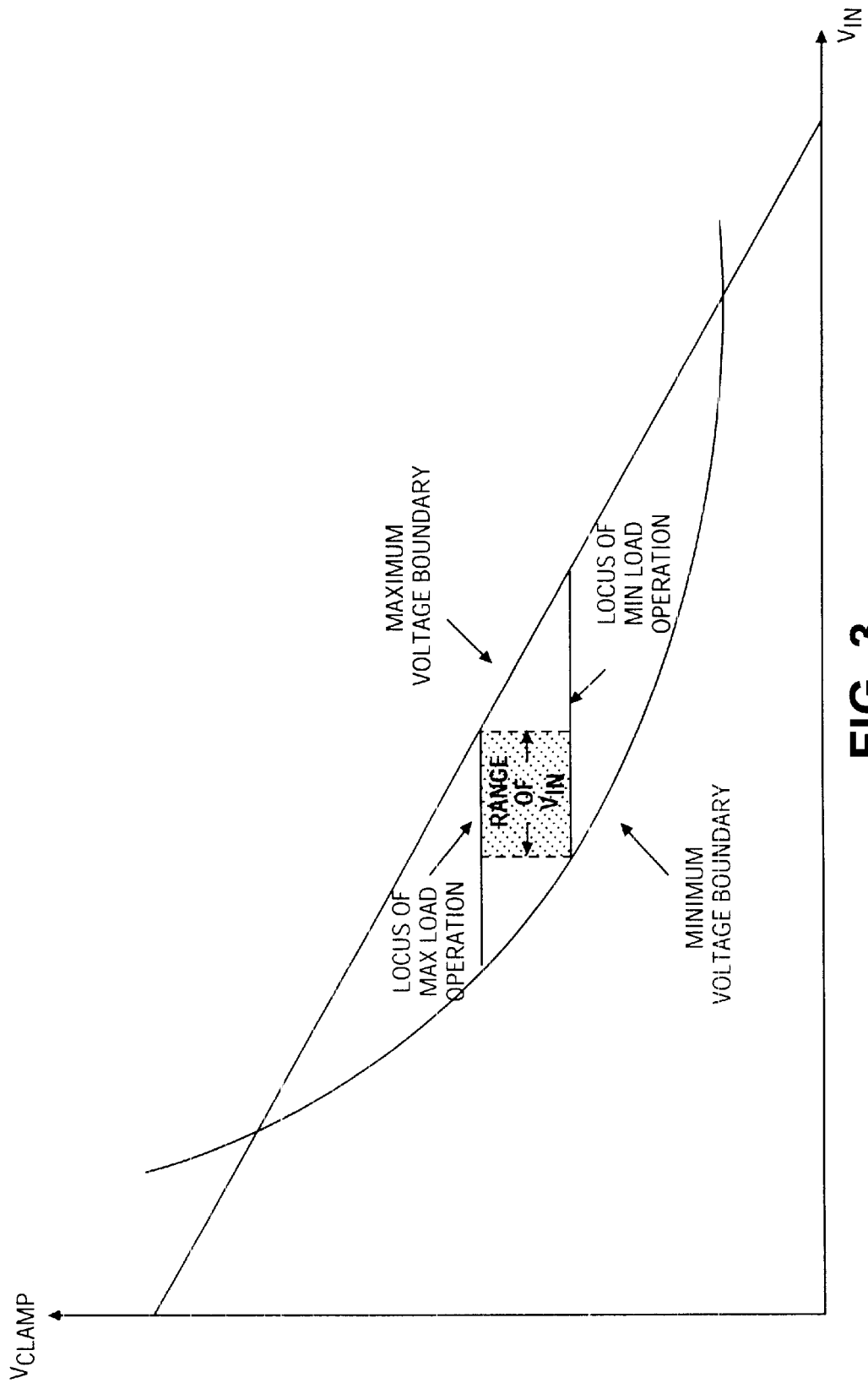
FIG. 3 is a diagram illustrating the relationship between the clamp voltage and the input voltage in a known power supply
Figure 5:
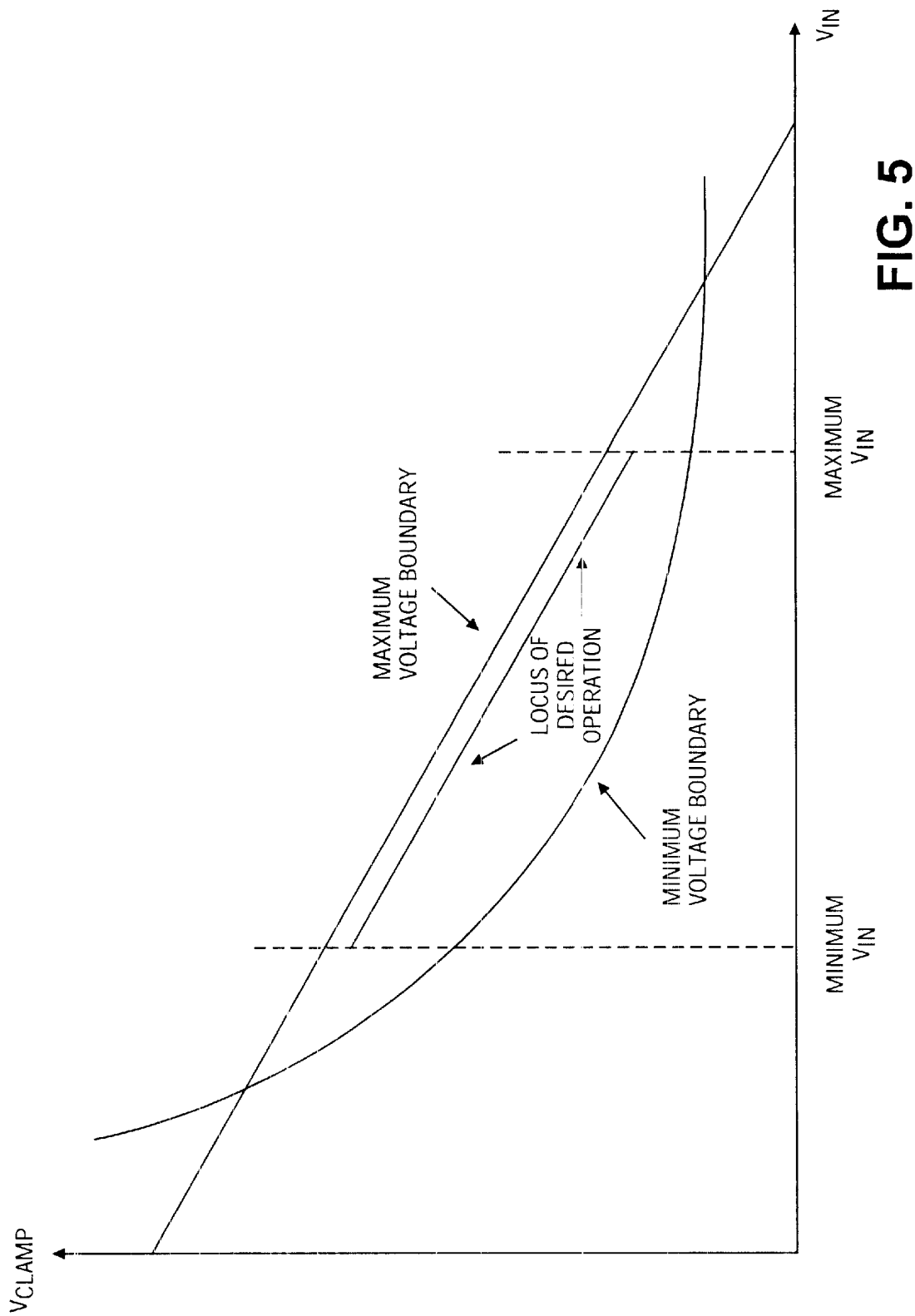
FIG. 5 is a diagram illustrating one embodiment of the relationship between the clamp voltage and the input voltage in accordance with the teachings of the present invention.

In one embodiment, the dissipative element 433 is adapted in accordance with the teachings of the present invention, which can be viewed as having the effect of changing the value of the resistor 113 in the RCD clamp network 111 of FIG. 1. The control from programming signal $S_1$ 439 from sensing network 431 adjusts the energy balance to maintain a desired locus of clamp voltage over an extended range of input voltage as illustrated in FIG. 5. As shown, in one embodiment the clamp voltage $V_{CLAMP}$ 423 is varied substantially inversely linearly with respect to the input voltage $V_{IN}$ 427 in accordance with the teachings of the present invention. Thus, in one embodiment, the clamp voltage $V_{CLAMP}$ 423 is varied substantially independent of the power supply output and/or leakage inductance of transformer 409.

With the variation in clamp voltage $V_{CLAMP}$ 423 as shown, the range of input voltages for $V_{IN}$ 427 is increased in accordance with the teachings of the present invention. Indeed, various embodiments of the present invention allow operation over an extended range of input voltage for $V_{IN}$ 427 while maintaining the clamp voltage $V_{CLAMP}$ 423 at a high value within the minimum and maximum boundaries as shown in FIG. 5. The higher voltages made possible by a variable clamp voltage $V_{CLAMP}$ 423, such as illustrated in FIG. 5, allows the use of parasitic capacitance in the primary winding 407 and secondary windings 443 to process some of the energy that otherwise would be dissipated in the clamp circuit 411.

Figure 6:
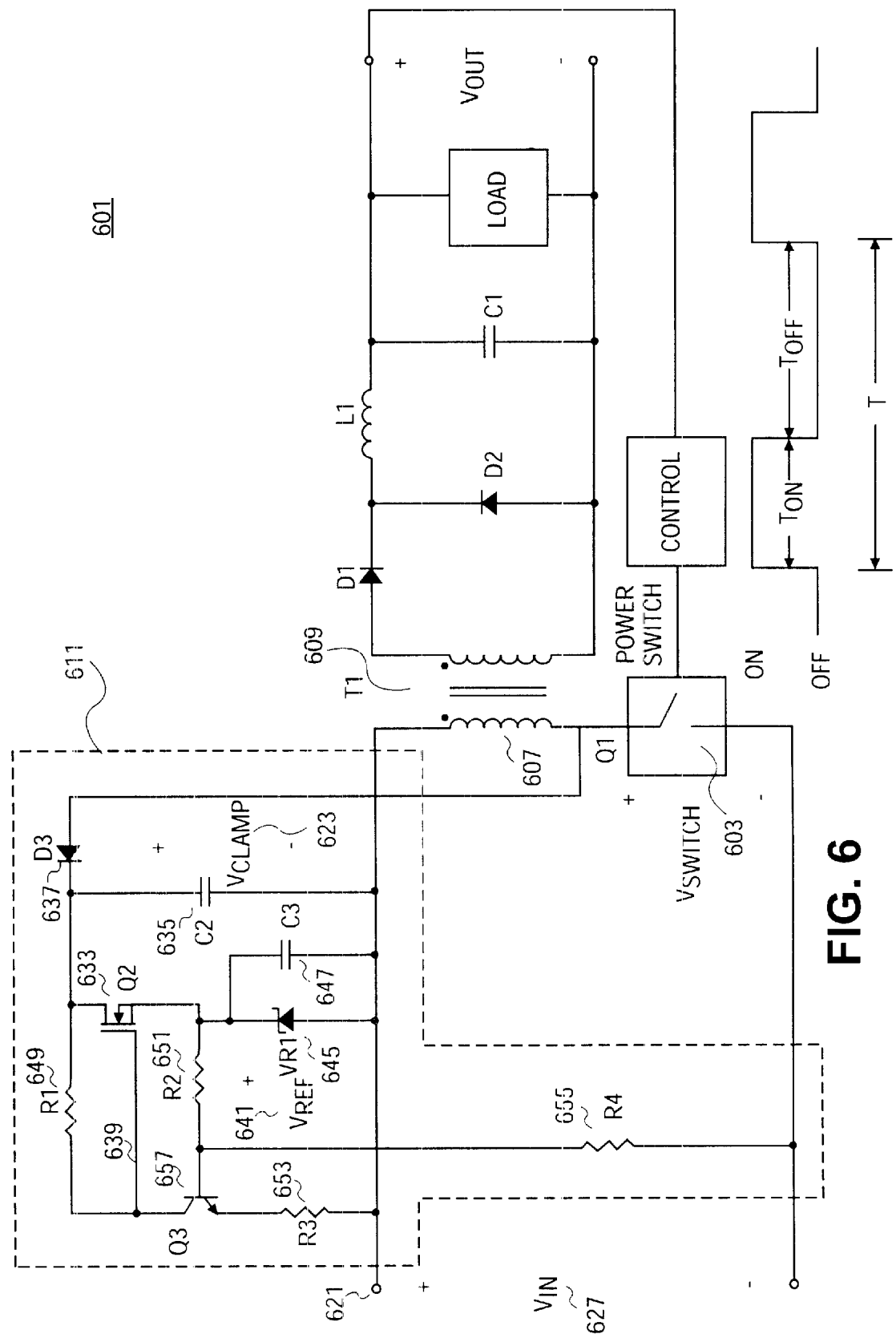
FIG. 6 is a schematic diagram illustrating one embodiment of a power supply using a dissipative clamp network in accordance with the teachings of the present invention.

FIG. 6 is a schematic illustrating one embodiment of an electrical circuit such as for example a power supply 601 utilizing a dissipative clamp network 611 in accordance with the teachings of the present invention. As shown in the depicted embodiment, diode D3 637 provides the unidirectional path for energy from the primary winding 607 of the transformer 609 to enter the network 611 and capacitor C2 635 is the energy storage element of the clamp network 611. Zener diode VR1 645 and capacitor C3 647 make a stable reference voltage $V_{REF}$ 641. In one embodiment, an N-channel metal oxide semiconductor (MOS) transistor Q2 is the principal dissipative element 633. In another embodiment, it is appreciated that other types of dissipative elements could be used in place of an N-channel MOS transistor such as for example p-channel MOS transistor, a bipolar transistor or the like or other future arising technology performing the function. In one embodiment, the sensing network in power supply 601 includes the connection of resistors R1 649, R2 651, R3 653 and R4 655 with transistor Q3 657. The voltage on the gate of transistor Q2 633 is the programming signal $S_1$ 639 that adapts the dissipation to achieve the desired characteristic of operation.

In one embodiment, resistors R2 651 and R4 655 form a voltage divider that applies a scaled value of the sum of the input voltage $V_{IN}$ 627 received at input 621 and the reference voltage $V_{REF}$ 641 from Zener diode $V_{REF}$ 645 to the base of transistor Q3 657. The current flowing through R3 653 is proportional to the difference in voltage between the base of transistor 657 Q3 and the input voltage $V_{IN}$ 627. The result is a current in the collector of transistor Q3 657 that decreases substantially linearly with increasing input voltage $V_{IN}$ 627. The collector current in transistor Q3 657 produces a voltage drop through resistor R1 649 such that the voltage, or programming signal $S_1$ 639, on the gate of transistor Q2 633 is proportional to the weighted sum of the clamp voltage $V_{CLAMP}$ 623 and the input voltage $V_{IN}$ 627. The gate voltage on the gate of transistor Q2 633 controls the current in the dissipative element transistor Q2 633 to adjust the clamp voltage $V_{CLAMP}$ 623 at a desired value for a given $V_{IN}$ 627.

A first order analysis using reasonable engineering approximations reveals that the behavior of the circuit of power supply 601 is described by the expression $$V_{CLAMP} = V_{REF}\left(1 + \frac{R1 \cdot R4}{R3(R2 + R4)}\right) - V_{IN}\left(2 - \frac{R1 \cdot R2}{R3(R2 + R4)}\right)$$

that describes a substantially straight line on the graph of $V_{CLAMP}$ versus $V_{IN}$, as shown in FIG. 5. An engineer can select values for resistances R1 649, R2 651, R3 653 and R4 655 along with $V_{REF}$ 641 to achieve the locus of desired operation as illustrated in FIG. 5.

Figure 7:
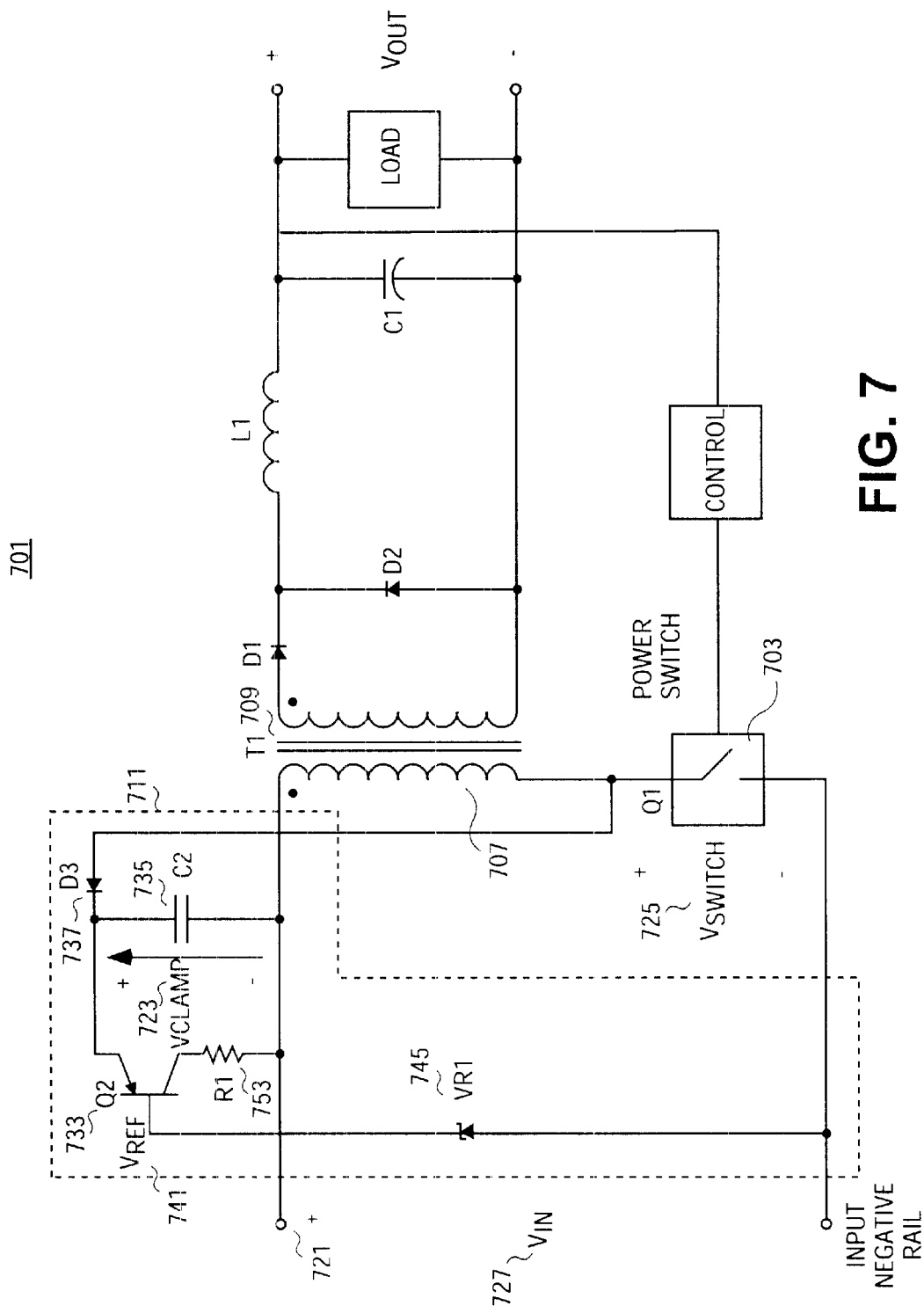
FIG. 7 is a schematic illustrating one embodiment of an electrical circuit such as for example a power supply utilizing a dissipative clamp network in accordance with the teachings of the present invention.

FIG. 7 is a schematic illustrating one embodiment of an electrical circuit such as for example a power supply 701 utilizing a dissipative clamp network 711 in accordance with the teachings of the present invention. As shown in the depicted embodiment, diode D3 737 provides the unidirectional path for energy from the primary winding 707 of the transformer 709 to enter the network 711. Zener diode VR1 745 makes a stable reference voltage $V_{REF}$ 741 relative to the circuit input negative rail of input 721. In one embodiment, a bipolar PNP transistor Q2 733 is the principal dissipative element. In another embodiment, it is appreciated that other types of dissipative elements could be used in place of a bipolar PNP transistor 733 such as for example a P channel MOSFET transistor. Resistor R1 753 is an optional additional dissipative element allowing the dissipated energy to be split between the bipolar transistor 733 and resistor R1 753. The energy is held by an energy storage element capacitor 735 and is lost through a dissipative elements transistor 733 and resistor 753.

In operation, the sum of the voltages $V_{IN}$ 727 across the input 721 and $V_{CLAMP}$ 723 across capacitor 735 is substantially constant. Thus, when $V_{IN}$ 727 is relatively low, $V_{CLAMP}$ 723 is relatively high. Conversely, when $V_{IN}$ 727 is relatively high, $V_{CLAMP}$ 723 is relatively low. Accordingly, $V_{CLAMP}$ 723 is responsive to $V_{IN}$ 727 received at input 721.

Since the reference voltage $V_{REF}$ 741 provided by zener diode VR1 745 is relative to the circuit input 721 negative rail, the operation of the clamp network 711 shown in FIG. 7 provides a clamp that limits $V_{CLAMP}$ 723 across capacitor 735 to the locus of desired operation shown in FIG. 5. In another embodiment is it appreciated that zener diode VR1 745 reference voltage $V_{REF}$ 741 could be achieved with several lower voltage zener diodes in series.

It is appreciated that in the illustrated embodiment, transistor 733 in combination with resistor 753 and diode 745 embody a sensing network to sense $V_{IN}$ 727 and thereby regulate the voltage across capacitor 735 such that the sum of $V_{IN}$ 727 and $V_{CLAMP}$ 723 remain substantially constant during circuit operation. Accordingly, the voltage $V_{SWITCH}$ 725 across power switch Q1 703 is maintained below a voltage limit of power switch Q1 703 in accordance with the teachings of the present invention.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An electrical circuit, comprising:
    a dissipative clamp circuit coupled to an input of the electrical circuit;
    an inductive element coupled between the dissipative clamp circuit and an output of the electrical circuit; and
    a switch coupled in series with the inductive element;
    the dissipative clamp circuit coupled to provide a clamp voltage across the inductive element, the clamp voltage provided by the dissipative clamp circuit varied in response to an input voltage received at the input of the electrical circuit, the dissipative clamp circuit coupled to maintain a voltage across the switch below a switch voltage limit.

2. The electrical circuit of claim 1 wherein the clamp voltage provided by the dissipative clamp circuit is varied in response to the input voltage received at the input of the electrical circuit such that a sum of the clamp voltage and the input voltage remain substantially constant during circuit operation.

3. The electrical circuit of claim 1 wherein the electrical circuit is a power conversion circuit.

4. The electrical circuit of claim 3 wherein the power conversion circuit is a forward converter power conversion circuit.

5. The electrical circuit of claim 1 wherein the dissipative circuit is coupled to be responsive to a varying amount of energy being clamped across the inductive element of the electrical circuit.

6. The electrical circuit of claim 5 wherein the amount of energy being clamped across the inductive element varies in response to a varying peak current in the inductive element.

7. The electrical circuit of claim 6 wherein the output of the electrical circuit is coupled to a load, the varying peak current in the inductive element to vary in response to changes in the load coupled to the output of the electrical circuit.

8. The electrical circuit of claim 6 wherein the varying peak current in the inductive element is coupled to vary in response to a soft start period of a control of the switch.

9. The electrical circuit of claim 1 wherein the dissipative clamp circuit comprises a second transistor coupled to the inductive element to dissipate energy stored in the inductive element.

10. The electrical circuit of claim 9 wherein the second transistor comprises a bipolar transistor.

11. The electrical circuit of claim 9 wherein the second transistor comprises a metal oxide semiconductor (MOS) transistor.

12. The electrical circuit of claim 1 wherein the inductive element comprises a winding of a transformer.

13. A method, comprising:
    switching a power supply input on an energy transfer element;
    regulating a power supply output by switching the power supply input on the energy transfer element;
    clamping a voltage on the energy transfer element to a clamp voltage; and
    varying the clamp voltage in response to an input voltage received at the power supply input.

14. The method of claim 13 wherein the varying of the clamp voltage is substantially independent of the power supply output.

15. The method of claim 14 wherein the varying of the clamp voltage is further substantially independent of leakage inductance of the energy transfer element.

16. The method of claim 13 wherein clamping the voltage on the energy transfer element comprises dissipating energy stored in leakage inductance of the energy transfer element in response to the power supply input.

17. The method of claim 16 wherein varying the clamp voltage comprises varying the clamp voltage substantially inversely linearly with respect to the power supply input.

18. A power supply, comprising:
    an energy transfer element having an energy transfer element input and an energy transfer element output coupled to an output of the power supply;
    a switching regulator circuit including a power switch coupled to the energy transfer element input, and a control circuit coupled to the power switch and the output of the power supply, the control circuit coupled to switch the power switch to regulate the output of the power supply; and
    a dissipative clamp circuit coupled to the energy transfer element input, the dissipative clamp circuit coupled to a power supply input to receive an input voltage, the dissipative clamp circuit including:
        a sensing network coupled to the power supply input to sense the input voltage;
        a dissipative element coupled to the sensing network and coupled to the energy transfer element;
        an energy storage element coupled to the energy transfer element and the dissipative element; and
        a first diode coupled between the power switch and the dissipative element and the energy storage element.

19. The power supply of claim 18 wherein the energy storage element comprises a capacitor coupled to the energy transfer element input and the first diode.

20. The power supply of claim 18 wherein the dissipative element comprises a first transistor coupled to the energy storage element, the first transistor coupled to dissipate energy in the energy storage element in response to signal received from the sensing network.

21. The power supply of claim 18 wherein the sensing network comprises:
    a voltage divider circuit coupled to a reference voltage circuit coupled to the power supply input to provide a scaled voltage responsive to a reference voltage added to the input voltage; and a second transistor coupled to the dissipative element and coupled to the voltage divider, the second transistor coupled to provide a current that is coupled to decrease linearly with increasing input voltage.

22. The power supply of claim 21 wherein the reference voltage is provided by the reference voltage circuit coupled to the power supply input, the reference voltage circuit including a zener diode coupled between the voltage divider circuit and the power supply input, the reference voltage circuit further including a second capacitor coupled between the voltage divider circuit and the power supply input.

* * * * *